United States Patent [19]

New

[11] Patent Number: 5,272,403
[45] Date of Patent: Dec. 21, 1993

[54] LOW FRICTION BACKUP SYSTEM FOR MAGNETIC BEARINGS

[75] Inventor: Nigel H. New, Harrow, England

[73] Assignee: The Glacier Metal Company Limited, Middlesex, England

[21] Appl. No.: 987,564

[22] Filed: Dec. 8, 1992

Related U.S. Application Data

[63] Continuation of Ser. No. 829,253, Feb. 3, 1992, abandoned.

[30] Foreign Application Priority Data

Feb. 15, 1991 [GB] United Kingdom ............... 9103256

[51] Int. Cl.$^5$ .................... H02K 7/09; H02K 7/08; F16C 21/00
[52] U.S. Cl. .................... 310/90.5; 310/90; 384/102
[58] Field of Search ............ 310/51, 90, 90.5; 384/101, 102, 279, 126, 297, 298, 907, 909, 910, 912

[56] References Cited

U.S. PATENT DOCUMENTS

| | | | |
|---|---|---|---|
| 3,642,331 | 2/1972 | Silver | 384/126 |
| 4,525,083 | 6/1985 | Pederson | 384/278 |
| 4,582,368 | 4/1986 | Fujita et al. | 384/279 |
| 4,629,261 | 12/1986 | Eiermann et al. | 310/90.5 |
| 4,848,934 | 7/1989 | Blakely et al. | 384/297 |
| 4,982,126 | 1/1991 | Jolivet et al. | 384/907.1 |
| 5,059,845 | 10/1991 | Wilson | 310/90.5 |

FOREIGN PATENT DOCUMENTS

| | | | |
|---|---|---|---|
| 0411695 | 2/1991 | European Pat. Off. | |
| 281902 | 6/1988 | Japan | 384/913 |
| 63-275815 | 11/1988 | Japan | |
| 63-289317 | 11/1988 | Japan | |
| 2-97250 | 4/1990 | Japan | 310/90.5 |
| 2033977 | 5/1980 | United Kingdom | |
| 2048195 | 12/1980 | United Kingdom | |

Primary Examiner—Steven L. Stephan
Assistant Examiner—C. LaBalle
Attorney, Agent, or Firm—Nixon & Vanderhye

[57] ABSTRACT

An assembly in which a rotating shaft is supported by a magnetic bearing has a back-up bearing to support the shaft in the event of failure of the magnetic bearing, the back-up bearing comprising one or more coaxial bearing parts each including cylindrical rolling elements supported on a single raceway, or each part comprising a ball race with radially inner and outer raceways. If a radially outer raceway is provided it is secured to an anchorage, such as a housing. A layer of dry bearing material is secured to rotate with each raceway to be rotated by the shaft, the dry bearing material having a surface opposite to the shaft. After any failure of the magnetic bearing the shaft is contacted by the layer of dry bearing material, and the rolling elements are brought up to speed at a slower rate than otherwise would be the case, because of slipping of the shaft relative to the dry bearing material. By the time the back-up bearing is rotating at the same speed as the shaft, the back-up bearing is rotating at a speed not significantly greater than the maximum design speed for the rolling elements.

6 Claims, 1 Drawing Sheet

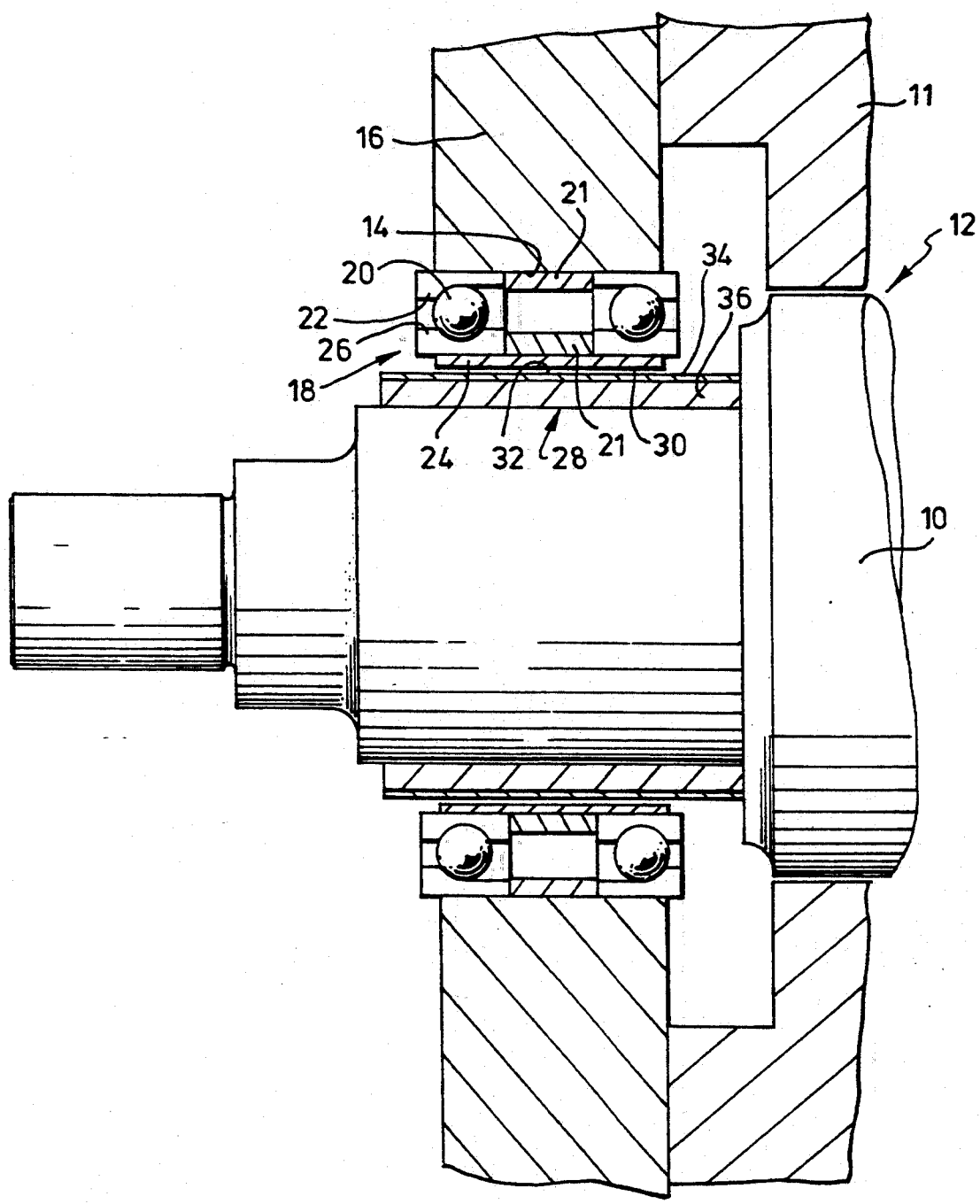

LOW FRICTION BACKUP SYSTEM FOR MAGNETIC BEARINGS

This is a continuation of application Ser. No. 07/829,253, filed Feb. 3, 1992 now abandoned.

This invention relates to an assembly in which a rotating shaft is to be supported by a magnetic bearing, but is to be supported by a backup bearing in the event of failure of the magnetic bearing. A magnetic bearing may be provided for a shaft having high rotational energy, and it is especially important in such a case to provide a satisfactory backup bearing for the shaft.

The backup bearing is required to be of a form to support the shaft in a satisfactory manner, and to enable the shaft to be brought to rest, after any failure in the operation of the associated magnetic bearing. While the shaft is being brought to rest, it is required that the shaft, any part of the assembly rotating with the shaft, and the backup bearing, do not become damaged, or worn.

The shaft is brought to rest by the rotational energy of the shaft being converted into heat by the shaft contacting the backup bearing, and then dissipating the heat, and/or by the rotational energy of the shaft's being absorbed by the system associated with the shaft doing work. If a substantial amount of the rotational energy of the shaft is to be converted into heat by the shaft's contacting the backup bearing, there is to be a high coefficient of friction associated with the backup bearing. Alternatively, if a substantial amount of the rotational energy of the shaft is to be absorbed by the system associated with the shaft, there is to be a low coefficient of friction associated with the backup bearing.

If the shaft is to be brought to rest in a short period, the rate of conversion into heat of the rotational energy of the shaft by the shaft contacting the backup bearing, and/or the rate of absorption of the rotational energy by the system associated with the shaft, is required to be high.

It is known to have a backup bearing having at least one constituent part with rolling elements, for example, each constituent part of the backup bearing comprising cylinders supported on a raceway; or comprising a ball race with radially inner and outer raceways; and possibly without the provision of any form of lubrication. The sole raceway, or the radially inner of two raceways, of each constituent part of the backup bearing is to rotate with the shaft when the magnetic bearing fails. If a radially outer raceway is provided it is secured to a suitable anchorage.

Usually the sole, or the radially inner, raceway is provided with a sleeve of brass, or hard bronze, to facilitate the rotation thereof when contacted by the rotating shaft. Any such construction for a backup bearing having rolling elements has a low coefficient of friction associated therewith, say of the order of 0.001. However, immediately after any failure of the magnetic bearing the shaft may be rotating at a speed greater than the maximum design speed limit of the rolling elements of such a back-up bearing. Thus, after any failure of the magnetic bearing it is common for a backup bearing with rolling elements to fail. However, it is sometimes desirable to employ a backup bearing having rolling elements, for example, when the clearance between the anchorage for the backup bearing and the shaft is small.

Plain bearings are known, each of which includes a layer of a dry bearing material. Such bearings usually fail by seizure of the otherwise relatively rotating, constituent parts of the bearing, due to expansion of the bearing material because of high temperatures being generated within the bearing. Such high temperatures are generated because the rate of conversion of rotational energy into heat by the bearing is greater than the rate of dissipation of heat therefrom. It will be understood that the rate of dissipation of heat varies with the temperature of the bearing, and the bearing fails, with the temperature at the value at which the constituent parts of the bearing seize by being mechanically welded together, when the rate of conversion of rotational energy into heat is greater than the rate of dissipation of the heat.

For convenience, hereinafter in this specification, and the accompanying claims, the term dry bearing material is used to refer to a known composition of a dry layer suitable to be included in a plain bearing. A surface provided by such a material has a low coefficient of friction associated therewith.

It has been proposed in our co-pending UK patent application No. 8917875.0 to provide, with a magnetic bearing, a backup bearing comprising a layer of dry bearing material co-operating with a layer of wear-resistant material, one such layer rotating with the shaft, and the other layer being on a stationary part of the assembly, and the materials of the layers are selected so that the rate of dissipation of heat generated within the backup bearing is greater than the rate the heat is generated, under normally encountered operating conditions for the assembly, and the shaft does not become seized with the backup bearing.

It is an object of the present invention to provide a novel and advantageous arrangement for a back-up bearing having rolling elements for an assembly in which a rotating shaft is to be supported by a magnetic bearing, the backup bearing having a construction such that it does not tend to be damaged, or worn, when the shaft is being brought to rest in the event of failure of the magnetic bearing, and when the shaft initially is rotating at a speed greater than the maximum design speed limit for the rolling elements of the backup bearing.

In accordance with the present invention an assembly in which a rotating shaft is to be supported by a magnetic bearing includes a backup bearing fixed to an anchorage and having rolling elements supported on at least one raceway to be rotated by the shaft; and a layer of a dry bearing material, secured for rotation with said at least one raceway, and providing a surface opposite to the shaft, in the operation of the assembly, the clearance between the opposing surfaces of the dry bearing material and the shaft is arranged to be less than the clearance between the rotating shaft and the magnetic bearing.

The cylindrical part of the rotating shaft opposite to, and to co-operate with, the layer of dry bearing material of the backup bearing also may be of dry bearing material and/or it may be of a wear resistant material. For convenience, in this specification and the accompanying claims, reference only is made to the layer of dry bearing material supported on the raceway being contacted by the rotating shaft unless otherwise appropriate, any layer on the shaft being considered to be part of the shaft.

Thus, the backup bearing includes at least part of a plain bearing of a conventional form, with the, or one, constituent layer of the plain bearing being secured to said at least one raceway for the rolling elements to be rotated by the shaft. Because of the presence of at least part of a plain bearing, when the backup bearing is required to be in operation, the rolling elements are brought up to speed at a slower rate than otherwise would be the case, because of slipping of the shaft within the dry bearing material. It is arranged, by selecting the appropriate coefficient of friction between the shaft and the layer of dry bearing material, that, by the time the backup bearing is rotating at the same speed as the shaft, inevitably the shaft is rotating at a speed at most not significantly greater than the maximum design speed for the rolling elements.

Further, the dry bearing material of the backup bearing is selected such that there is a desired coefficient of friction with the shaft, taking into account the rate at which heat can be dissipated from the assembly before the seizure of the shaft with the backup bearing occurs.

The coefficient of friction between the dry bearing material of the backup bearing and the shaft is required to be greater than that associated with the remainder of the backup bearing.

Hence, the backup bearing easily can be arranged so that the backup bearing, including the dry bearing material; and the shaft; do not become damaged, or worn, whilst the shaft is being brought to rest after any failure of the magnetic bearing.

Also for convenience in this specification, and the accompanying claims, reference is made to the coefficient of friction between the dry bearing material of the backup bearing and the shaft being relatively low when it is less than 0.2; and reference is made to this coefficient of friction being relatively high when it is greater than 0.2.

The dry bearing material may comprise a dry lubricant, such as graphite, held within a matrix of a sintered powder, say, of tin bronze, inevitably there being a relatively low coefficient of friction associated therewith. Alternatively, the dry bearing material may comprise a textile material, say, of asbestos or glass fiber, impregnated with a phenolic resin, and having a relatively high coefficient of friction associated therewith.

BRIEF DESCRIPTION OF THE DRAWING

The present invention will now be described by way of example with reference to the accompanying drawing Figure, comprising a side elevation, partially sectioned, of one embodiment, in accordance with the present invention, of an assembly with a rotating shaft mounted within a magnetic bearing, and there being provided a backup bearing.

DETAILED DESCRIPTION OF THE DRAWING

As shown in the accompanying drawing, an assembly includes a rotating shaft 10 mounted within a conventional magnetic bearing, indicated generally at 11, the gap between the magnetic bearing and the shaft being indicated at 12.

One end of the shaft 10 is illustrated, and this end protrudes through an aperture 14 in a apart of a housing 16 for the assembly, only this part of the housing being shown. Within the aperture 14 in an anchorage comprising the housing 16 in which is provided a backup bearing for the assembly, the backup bearing being indicated at 18.

In accordance with the present invention, the backup bearing 18 includes rolling elements 20 supported in radially inner and outer raceways. In the illustrated arrangement there are two substantially conventional ball races, and each ball race is fabricated in a very precise manner, and no lubricant is provided therein. The two ball racers are axially separated by two spacers 21. Each radially outer raceway 22 is secured to the housing 16 by being an interference fit within the aperture 14. A layer of dry bearing material 24 is secured to each radially inner raceway 26. Opposite to the layer of dry bearing material 24 is a layer of material 28, secured to the shaft 10 by being a press fit on a reduced diameter cylindrical part thereof. The layer of material 28 is considered to be part of the shaft 10. In particular, the radially inner surface 30 of the layer 24 of dry bearing material is opposite to the radially outer surface 32 provided by a wear-resistant surface layer portion 34 of the layer 28.

In one example of the assembly, and with the assembly in operation, the clearance between the magnetic bearing 11 and the shaft 10, comprising the gap 12, is 0.5 millimeter; and the clearance between the opposing surfaces 30 and 32, respectively, of the backup bearing 18, and the shaft, is 0.25 millimeter.

It is required that the shaft 10 is brought to rest after any failure in the operation of the magnetic bearing 11, and before the shaft, any part of the assembly rotating with the shaft, and the backup bearing, becomes damaged, or worn; and it is required that the shaft and the backup bearing 18 do not become seized, because of temperature rises within the backup bearing, and the shaft.

Heat is generated by contact of the shaft with the backup bearing, and is dissipated substantially by conduction through the shaft 10; by conduction to any part of the assembly secured to the shaft; and by conduction to the stationary part 16 in which the backup bearing 18 is provided. Usually the shaft 10 is at least substantially of steel, and has a high coefficient of thermal conductivity.

If the arrangement is such that heat can be dissipated only at a low rate before the backup bearing 18 and the shaft 10 become seized together, the coefficient of friction between the layers 24 and 34 has to be relatively low. Hence, each radially inner raceway 26 takes a relatively long time to be brought to the speed of the shaft.

Alternatively, if the arrangement is such that heat can be dissipated at a high rate before the backup bearing 18 and the shaft become seized together, the coefficient of friction between the layers 24 and 34 may be higher than for the arrangement described above. Consequently, each radially inner raceway 26 may take only a short time to be brought to the speed of the shaft. It is required to ensure that the rate of conversion of the energy of the rotating shaft to heat by contact of the shaft with the backup bearing is less than the rate of dissipation of heat at expected normally encountered temperatures of the backup bearing.

The layer 24 of dry bearing material of the backup bearing 18 comprises a dry lubricant, such as graphite, or molybdenum disulphide, or tungsten disulphide, or polyethylenetetrafluoride, held by a matrix of a sintered powder, say, of tin bronze, if there can be only a relatively low coefficient of friction between the layers 24 and 34.

Alternatively, the layer 24 of dry bearing material of the backup bearing 18 is of a textile material, say, of asbestos or glass fiber, impregnated with a phenolic resin, if there can be a relatively high coefficient of friction between the layers 24 and 34.

When there is a relatively high coefficient of friction between the layers 24 and 34, conveniently, as shown, the layer 28 comprises a composite layer, the wear-resistant layer 34 being on a layer 36 comprising a sink for the heat generated between the layers 24 and 34. In the illustrated embodiment the layer 28 has a surface layer portion 34 of hard chromium, and providing the wear-resistant surface 32, plated onto a layer 36 of an alloy of copper and chromium, having a Vickers hardness value of 130, and having a thermal conductivity of 0.95 calories per sec cm °C.

Whether there is required to be a relatively low, or a relatively high, coefficient of friction between the layers 24 and 34, it is required that these layers have compositions which are not likely to become seized together, by becoming mechanically welded to each other, at temperatures expected to be generated in the operation of the backup bearing.

However, further, and in particular for an arrangement in accordance with the present invention, it is required that the backup bearing does not become damaged, or significantly worn, by the rolling elements 20 rotating at a speed greater than the maximum design speed for the backup bearing 18, when the shaft 10 is rotating at a speed greater than this value in operation. Hence, it is required to be arranged that, when the magnetic bearing 11 fails, and the shaft 10 first contacts the layer of dry bearing material 24 of the backup bearing, the backup bearing 18 is brought up to speed at a slower rate than otherwise would be the case, because of slipping of the shaft relative to the layer of dry bearing material 24. In addition, the assembly is arranged to be such that, under normally encountered operating conditions, by the time the backup bearing 18 is rotating at the same speed as the shaft, inevitably the backup bearing is rotating at a speed at most not significantly greater than the maximum design speed for the rolling elements 20. This criterion is obtained by a suitable selection of the coefficient of friction between the shaft 10 and the layer 24 of dry bearing material, commensurate with the shaft and the layer of dry bearing material not becoming seized together, as referred to above.

Modifactions to the illustrated assembly are possible.

The layer 28 on the shaft may not include a layer 36 of a material of high thermal conductivity.

It is not essential that a layer of wear-resistant material 34 is provided on the shaft, and instead, the layer 34 is of a dry bearing material as referred to above; or the layer 34 is omitted, and the layer of dry bearing material 24 of the backup bearing directly contacts the shaft 10.

The stationary part 16 of the assembly may not comprise a housing.

Any required number of ball races may be provided.

Any suitable form of backup bearing with rolling elements may be provided, for example, comprising at least one bearing having cylindrical rolling elements supported in a single raceway to rotate with the shaft.

I claim:

1. An assembly in which a rotating shaft is to be supported by a magnetic bearing, the assembly comprising: a backup bearing fixed to an anchorage and having rolling elements supported on at least one raceway to be rotated by the shaft, and a layer of a dry bearing adapted to bring the rotating shaft to rest in the event of a failure of the magnetic bearing, the backup bearing material comprising a dry lubricant held by a matrix of sintered powder secured for rotation with the said at least one raceway, and providing a surface opposite to the shaft, said at least one raceway and said layer of dry bearing material arranged and configured such that, in the operation of the assembly, a clearance is provided between the opposing surfaces of the dry bearing material and the shaft which is smaller than a clearance between the rotating shaft and the magnetic bearing.

2. An assembly as claimed in claim 1, in which the coefficient of friction between the layer of the dry bearing material of the backup bearing and the shaft is relatively low.

3. An assembly as claimed in claim 2, in which the layer of dry bearing material comprises a dry lubricant held within a matrix of a sintered powder.

4. An assembly as claimed in claim 1, in which a layer of wear-resistant material is provided on the shaft, and is arranged to be contacted by the layer of dry bearing material of the back-up bearing.

5. An assembly as claimed in claim 4, in which the layer of wear-resistant material is on a layer of material with a high coefficient of thermal conductivity, comprising a heat sink.

6. An assembly as claimed in claim 5, in which the layer of wear-resistant material is of hard chromium plated onto a layer of an alloy of chromium and copper.

* * * * *